July 20, 1965 G. J. HAUFLER ET AL 3,195,622
LATERAL VALVE CONTROL FOR AIR CONDITIONING EQUIPMENT
Filed Jan. 23, 1961 3 Sheets-Sheet 1
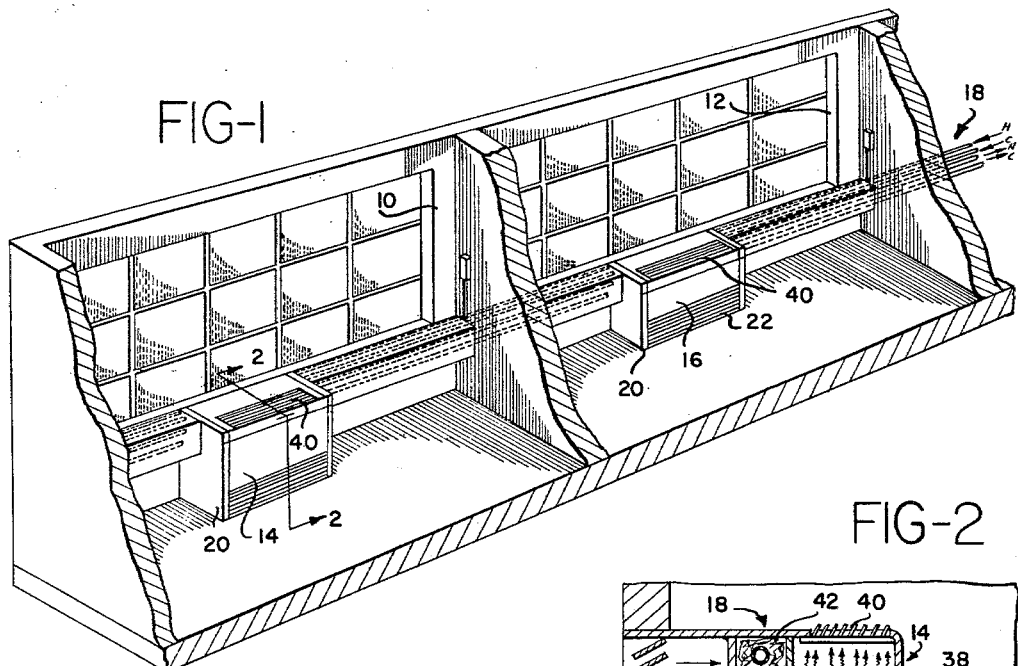
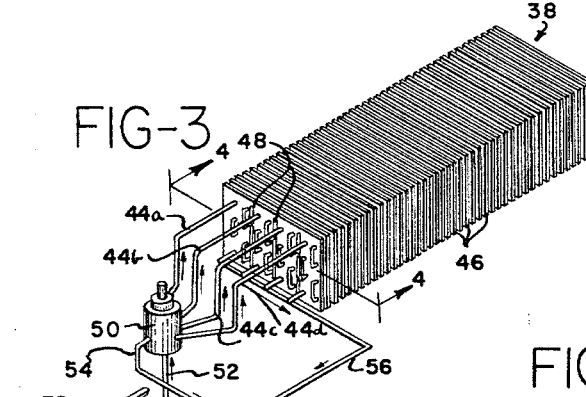
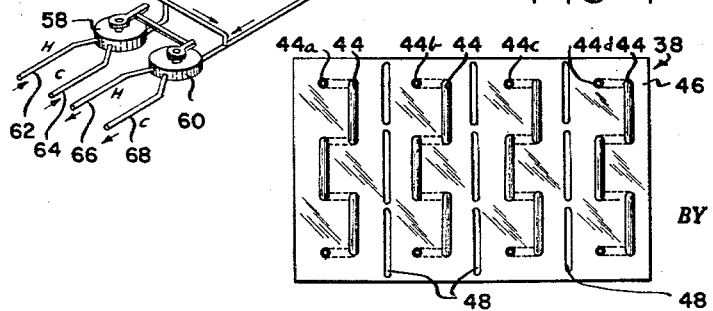
INVENTOR.
ROBERT W. GREENE JR.
GEORGE J. HAUFLER
BY
ATTORNEYS

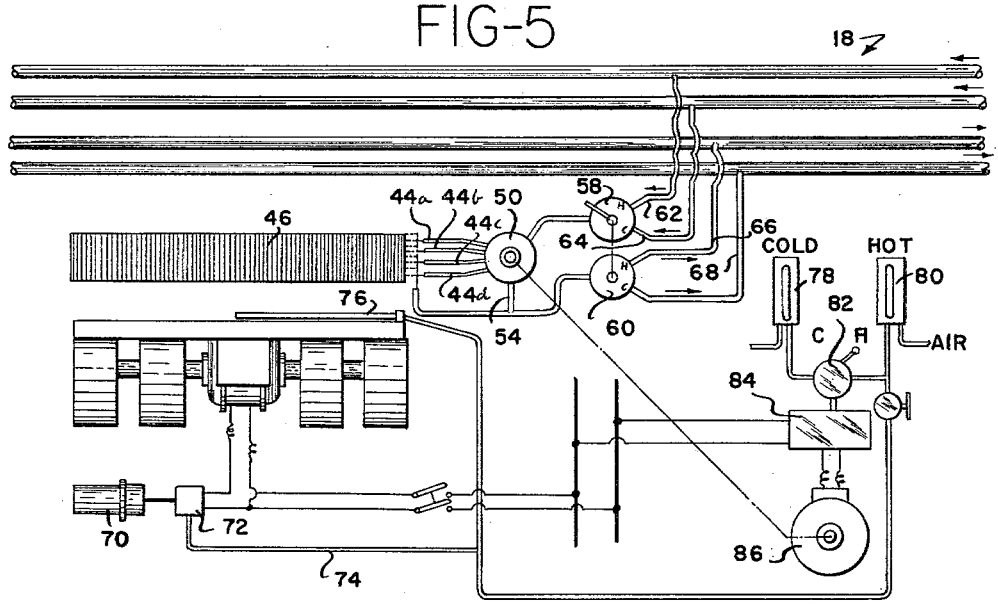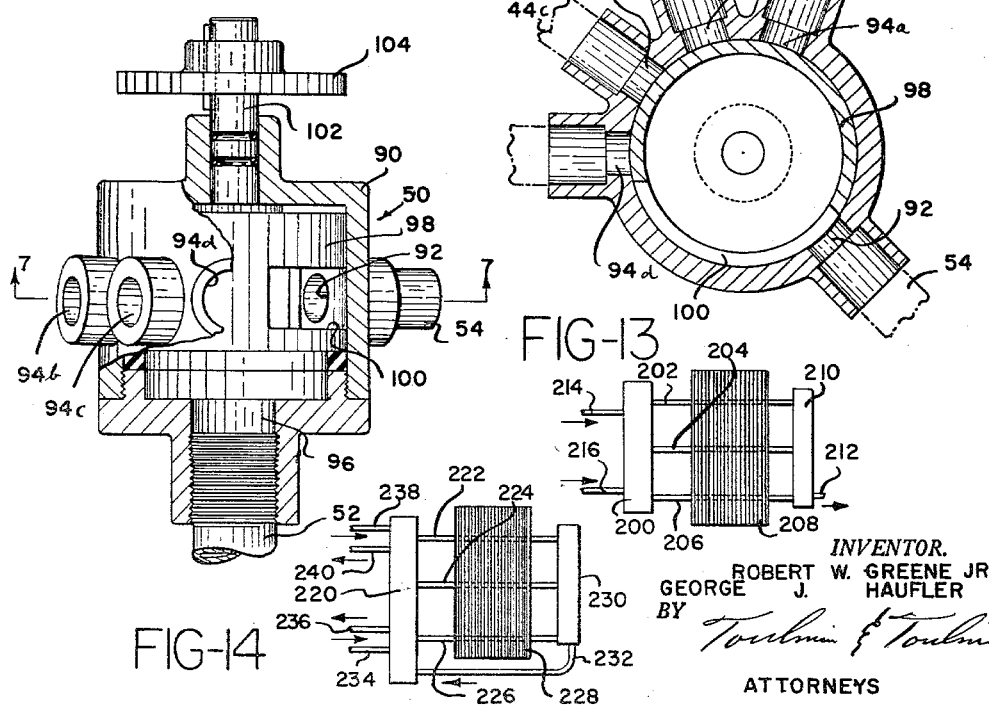

July 20, 1965   G. J. HAUFLER ETAL   3,195,622
LATERAL VALVE CONTROL FOR AIR CONDITIONING EQUIPMENT
Filed Jan. 23, 1961   3 Sheets-Sheet 3
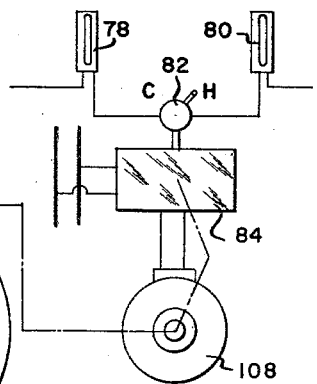
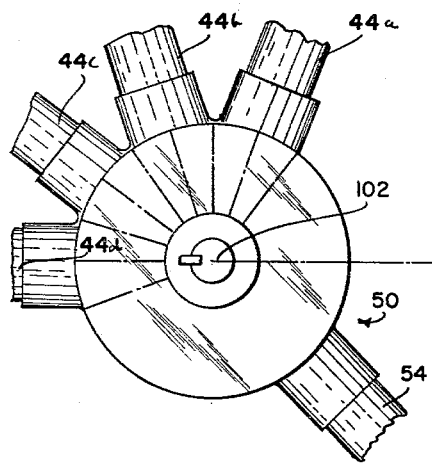
FIG-8
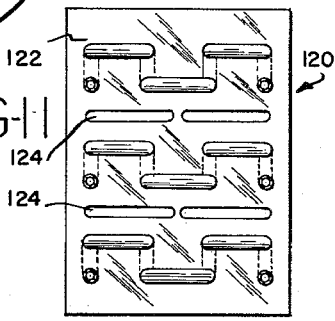
FIG-10
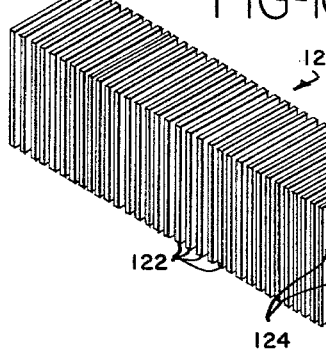
FIG-11
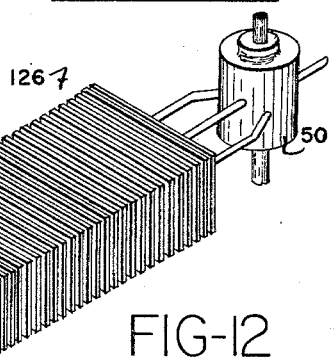
FIG-12
FIG-9
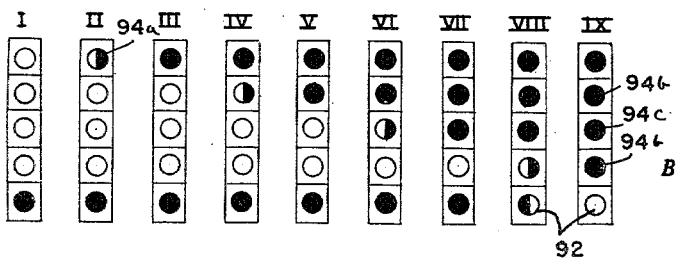
INVENTOR.
ROBERT W. GREENE JR.
GEORGE J. HAUFLER
BY
ATTORNEYS

United States Patent Office 3,195,622
Patented July 20, 1965

3,195,622
LATERAL VALVE CONTROL FOR AIR
CONDITIONING EQUIPMENT
George J. Haufler and Robert W. Greene, Jr., Philadelphia, Pa., assignors, by mesne assignments, to International Telephone and Telegraph Corporation, New York, N.Y., a corporation of Maryland
Filed Jan. 23, 1961, Ser. No. 84,246
2 Claims. (Cl. 165—101)

This invention relates to air conditioning systems and is particularly concerned with a novel control arrangement for controlling air conditioning equipment for either heating or cooling purposes.

Air conditioning systems involving circulation of fluids through coils and the like are generally controlled by controlling the operation of a fan circulating air through the coil, or by on-off valve control to control the heat transfer medium, by modulating valve control, and by air bypass control and the like.

For economy and improved performance, modulating valve control and air bypass control have become the most widely used control systems. Each of these systems, however, has certain drawbacks, which it is the purpose of the present invention to eliminate.

With conventional modulating control, for example, the flow of the heat transfer medium is reduced as the requirement for heating or cooling decreases. During a cooling operation, the net effect of this sort of control is to raise the average temperature of the entering and leaving heat transfer medium in proportion to the demands indicated by the thermostatic control element. As a result, the surface temperature of the heat exchange element or coil increases, and although low enough to effect the desired cooling of the air to the dry bulb temperature required, the said surface temperature is above the dew point of the unconditioned air and there is, thus, little or no moisture removal accomplished.

This, of course, results in high relative humidity in conditioned areas during conditions of reduced load. This undesirable result is avoided in conventional on-off valve control, but the same fineness of temperature control cannot be effected thereby.

The air bypass method referred to is much superior to conventional on-off valve control with respect to moisture removal under reduced cooling requirements. With the air bypass system, a constant flow of heat transfer medium is supplied to the heating-cooling element and quantities of air are bypassed around the element in accordance with the demand indicated by the thermostat.

Since full flow of the heat transfer medium is always had, all air flowing through the heating-cooling element is subjected to maximum removal as well as being cooled to the required dry bulb temperature during the cooling operation.

While the air bypass method has the foregoing advantage, there are several disadvantages to the use of dampers as the principal controlling device. For example, dampers are more susceptible to the mechanical defect of binding, warping and the like, and moreover, the proportioning characteristics of a damper arrangement are inferior to those of a valve.

This is particularly noticeable during a season requiring heating because, in addition to the poor proportioning characteristics, there is no positive shutoff of the heating capacity and over-heating is apt to result. Still further, dampers do not provide a positive seal against air flow through the heating-cooling element and do not adequately insulate the air from the radiant effect of the fully warmed heating-cooling element.

Having the foregoing in mind, it is a principal objective of the present invention to provide an air conditioning system characterized in that a control arrangement is provided which eliminates the drawbacks referred to above.

Another object of this invention is the provision of a control system for an air conditioning system in which the best features of the several systems referred to above are retained while avoiding the deficiencies thereof.

A particular object of the present invention is the provision of a control system for an air conditioning arrangement in which the simplicity of an on-off valve control system is had, while, at the same time, obtaining the more or less complete continuous control of a modulating valve arrangement.

A still further object of this invention is the provision of an air control system for controlling the supply of heat transfer medium to a heating-cooling element which can be embodied in substantially any conventional type of air conditioning unit.

Still another object of this invention is the provision of a novel type heating-cooling element for air conditioning systems which has the characteristics of a plurality of individual heating-cooling elements.

Still another object of this invention is the provision of a control arrangement for controlling the supply of heat transfer medium to a heating-cooling element in an air conditioning system that provides for positive shutoff, reliable operation, close temperature control, and a high degree of humidity control.

Still another object of this invention is the provision of a method of controlling the flow of heat transfer medium through a heating-cooling element in such a manner that the foregoing advantages are obtained.

The several advantages and objects of the present invention, referred to above, are obtained, in brief, by subdividing a heating-cooling element, which can be referred to as a heat transfer element, into sections and individually controlling the flow of heat transfer medium through the individual sections of the element in order to obtain the desired control of the heating or cooling characteristics of the element on air passing therethrough. The system, according to this invention, is considered to be most useful in connection with multiple unit systems employing water as the heat transfer medium. However, it is contemplated, also, to employ the invention in connection with a single unit system in which one air conditioner meets the demands of several rooms.

In the application of the present invention to a unit conditioner of the type that would be located within a room, we prefer to arrange a plurality of coils in the air stream to be conditioned with common fins extending across the coils parallel to the air stream therethrough with the fins preferably being interrupted, at least partially, between the coils, whereby the heat transfer element is effectively sectionalized or subdivided into portions that can operate as separate individual elements.

The several objectives and advantages of the present invention are then obtained by controlling the flow of heat transfer medium through the individual coils so that the individual coils are either full on or full off or carrying a predetermined fraction of their total capacity. A single valve on either the inlet or outlet sides of the coils effects this control and the net result is an extremely simple system having the several advantages, referred to above.

The present invention will be more readily contemplated upon reference to the following specification taken in connection with the accompanying drawings in which:

FIGURE 1 is a diagrammatic perspective view showing two individual air conditioning units according to this invention located in separate rooms with there being a common supply of the heat transfer medium to the air conditioning units and with the air conditioning units having individual controls;

FIGURE 2 is a vertical sectional view indicated by line 2—2 on FIGURE 1 showing one form which the air conditioning unit can take;

FIGURE 3 is a more or less diagrammatic view showing the construction of the heat exchange element in the air conditioning unit of FIGURE 2 and, also, showing the supply system for the heat exchange medium supplied thereto;

FIGURE 4 is a sectional view indicated by line 4—4 on FIGURE 3 showing the appearance of the heat transfer element from one end;

FIGURE 5 is a more or less diagrammatic representation of one of the air conditioning units of FIGURE 1 showing the thermostatic elements controlling the unit in the connection unit to the supply lines that supply the heat exchange medium thereto;

FIGURE 6 is a view, partly in section, showing the single control valve by means of which the flow of heat exchange medium to the several coils of the heat transfer element is controlled;

FIGURE 7 is a sectional view indicated by line 7—7 on FIGURE 6;

FIGURE 8 is a view showing one manner in which the control valve can be actuated into its several effective positions;

FIGURE 9 is a diagrammatic representation showing the flow through the various ports of the control valve in its several adjusted positions;

FIGURE 10 is a diagrammatic view similar to FIGURE 3, but shows the heat transfer element subdivided by laterally dividing planes rather than being subdivided by vertically subdividing planes as in FIGURE 3;

FIGURE 11 is a view similar to FIGURE 4 but is taken looking in from the right end of the heat transfer element of FIGURE 10;

FIGURE 12 is a diagrammatic perspective view showing the manner in which the control valve can be placed at the discharge end of the heat transfer element instead of at the inlet end thereof as are FIGURES 3 and 10.

FIGURE 13 is a diagrammatic representation of the system showing how one control valve could control the supply of both hot heat exchange medium and cold heat exchange medium to the heat transfer element with there being a common return pipe; and FIGURE 14 is a view similar to FIGURE 13 but shows how a single control valve could be employed with both the hot and supply being passed through the control valve and with there being separate hot and cold return lines leading from the control valve.

Referring to the drawings somewhat more in detail, FIGURE 1 shows a portion of a building in which there are rooms 10 and 12 having individual air conditioning units 14 and 16, respectively.

A plurality of conduits indicated at 18 lead across one wall of the room for the supply of heat transfer medium to and the return thereof from the air conditioning units.

FIGURE 2 is a section through one of the units and it will be seen to comprise a casing 20 having an indoor air inlet 22 and an outdoor air inlet 24. The air inlets lead through their respective filters 26 and 28 to a chamber 30 on the suction side of a fan which has an inlet opening 32. A roll damper 34 is movable for varying the effective areas of the inlets and is movable from a position where the air intake to the fan is all outside air to a position where the air intake to the fan is all intake air.

The air discharged by the blower passes into another chamber 36 and then upwardly through a heat transfer element 38 and thence through outlet 40 into the room being conditioned.

The conduits 18 may pass through a region 42 in the compartment provided with insulation so that there is a minimum of heat transfer between these pipes and the air conditioning unit.

The heat transfer element 38, according to this invention, is illustrated more in detail in FIGURES 3 and 4. In these figures, it will be noted that the heat transfer element comprises a plurality of individual coils 44 which are interconnected in a unitary assembly by the fins 46 extending in the direction of air flow.

These fins 46 provide efficient means for exchanging heat between the coils 44 and the air passing through the heat transfer element. The heat transfer element is effectively sectionalized by partially interrupting the fins 46 between the individual coils. In FIGURES 2, 3, and 4, these interruptions will be seen to consist of elongated slot means 48 which greatly reduces the metal flow path for the heat between the individual sections of the heat transfer element.

As will be seen in FIGURE 3, the upper ends of the several coils are connected by conduits 44a, 44b, 44c, and 44d with outlet ports of a control valve 50 having a conduit 52 leading to the inlet thereof and, also, having a discharge port to which is connected a drain conduit 54.

The lower ends of the several coils are connected to another branch 56 of the drain conduit.

Inasmuch as the air conditioning unit could be used for either heating or cooling, the supply conduit 52, as well as the drain conduit, leads to a valve arrangement 58, 60, such that the supply conduit 52 can be selectively connected with either a hot water supply line 62 or with a cold water supply line 64 while the drain conduit can be connected with either a hot water drain line 66 or a cold water drain line 68.

One manner in which the air conditioner unit could be controlled is illustrated in FIGURE 5. In this figure, the damper 34 has connected therewith an adjusting motor 70 that is under the control of a switch means 72 which switch means is, in turn, controlled pneumatically by pressure in a pilot line 74.

Pilot line 74 leads to an air stream thermostat 76 located on the discharge side of the blower and, also, leads to the room thermostat arrangements 78 and 80. Pneumatic control systems of this nature are well known and, in themselves, form no part of the present invention.

The hot and cold room thermostats 78 and 80 are made selectively effective by a selector valve 82 which, in addition to being connected to the room thermostats, is, also, connected with an electric controller 84 which is effective for controlling motor 86 that is connected with the movable element of valve 50.

The nature of valve 50 is illustrated in FIGURES 6 and 7 wherein it will be seen the valve comprises a casing 90 having an outlet port 92 to which is connected drain conduit 54 and ports 94a, 94b, 94c, and 94d connected with conduits 44a, 44b, 44c, and 44d, respectively. The valve casing 90, also, comprises an inlet port 96 to which is connected supply conduit 52.

Inside casing 90 is a rotatable valve member 98 which is hollow and the interior of which connects continuously with inlet port 96.

The valve member has formed in its periphery in the plane of ports 92 and 94a through 94d, a slot 100 which is operable, as the valve member rotates for communicating the interior of the valve member with the several ports or with the drain or bypass port 92.

Rotation of the valve member is had by a stem 102 extending upwardly through the top of the valve casing and having attached thereto an actuating member, such as a Geneva wheel 104.

FIGURE 8 illustrates the manner in which the Geneva wheel 104 is utilized for positioning the valve member 98 in its several positions. Associated with Geneva wheel 104 is a rotary drive arm 106 which is driven by motor 108 that is under the control of the electro-pneumatic controller 84. Motor 108 is arranged to make one revolution in response to the determination by whichever one of the room thermostats 78 or 80 which is effective of a predetermined difference in temperature between the desired temperature in the room and the actual temperature.

In one extreme adjusted position of the valve member, all of ports 94 are in direct communication with the interior of the valve member and, thus, with the inlet port 96 whereby there is a maximum rate of flow of heat transfer medium through all of the coils of the heat transfer element 38.

At this time, the drain or bypass port 92 is closed off so that all of the fluid flowing through the pertaining air conditioning unit is passing through the heat exchange element. This condition is indicated by numeral I in FIGURE 9 wherein the four top rows represent the ports 94 and the bottom row represents the drain or bypass port 92.

The open circles in FIGURE 9 indicate the port full open, the black circles show the port completely closed and the half black circle shows that the port is half open.

Progressing across the diagram of FIGURE 9, the valve member 98 from its extreme clockwise position, in which all of the ports 94 are full open, progresses in a counter-clockwise direction in steps so that in position II, port 94a is half closed, whereas in position III, this port is completely closed.

Thus, in position I, all four coils are operated at full capacity. In position II, three coils are operated at full capacity and one coil is at half capacity and at position III, three coils are operated at full capacity and one coil is completely closed off.

Progressing on rightwardly of the chart in FIGURE 9, it will be noted that each successive position of the valve member reduces the capacity of the heat transfer element by one-half coil up to position VIII in which the bypass port 92 is half open onto position IX where all four coils are shut off and the bypass port is completely open.

It will be evident that the net effect is that the control of each coil is substantially like an on-off control, but the overall result for the entire heat transfer unit is that of a modulating valve control. For only three effective positions of the control valve for each coil, a total of nine effective rates of heat exchange can be had. A fine degree of control can, thus, be effected without the problems that attend modulating valve control or air bypass control.

As a matter of convenience, only two flow rates have been illustrated for each coil. In many instances this will be sufficient but, it is to be understood that there can be many more steps of flow control provided for each coil within the purview of this invention, and that even full modulation consisting of continuous control could be provided if so desired.

As will be seen in FIGURES 10 and 11, the heat transfer element 120, illustrated therein, could have the coils thereof extending generally horizontally so that instead of the coils being side by side for vertical air flow therethrough, they would be on top of each other in superimposed relation.

The fins 122 would then be divided by the laterally extending slot means 124. Either of the heat transfer elements referred to could be utilized for either vertical or transverse air flow and the same advantages that have been referred to would be had.

In the modifications previously described, the control valve 50 was located on the inlet side of the heat transfer element, but, as will be seen in FIGURE 12, the heat transfer element 126 could be supplied at its inlet side from conduit 128 by way of a manifold 130 with the control valve 50 according to this invention located at the discharge side of the heat transfer element.

The valve is equally effective in its FIGURE 12 position for effecting the selective control of the several sections or individual coils of the heat transfer element.

From the foregoing, it will be seen that the present invention provides an improved valve control and an improved method of controlling flow in the heat transfer element of an air conditioning unit. According to the method of this invention, the flow through one portion of the heat transfer element is modulated while other portions remain completely on or completely off. The advantages of both step and modulating control is, thus, had by arranging a plurality of individual circuits for sequential step control through the entire range of control.

Each individual circuit is controlled from full on to full off before the next section or next individual coil commences to be modulated.

As will be seen in FIGURE 13, there could be a control valve 200 connected to the inlets of three coils 202, 204, and 206 of the heat transfer unit 208 with the said coils being connected to a return header 210 from which leads a common return pipe 212.

The control valve 200 has connected thereto a supply conduit 214 for a heating medium and also a conduit 216 for a cooling medium. One and the same control valve could thus embody the functions of the several valves illustrated in FIGURES 3 and 5.

In FIGURE 14, the control valve as indicated at 220 and connected thereto are the coils 222, 224, and 226 of the heat transfer unit 228. The coils lead to a header 230 that has a conduit 232 leading back to the control valve 220.

Control valve 220 has a supply conduit for heating medium at 234 with there being a return line for the heating medium at 236 and with the cold heating medium supply leading to the valve through a conduit 238 and with the cold medium return leaving the valve by way of a conduit 240. The particular internal connections in the control valve in FIGURES 13 and 14 have not been illustrated but it will be understood that these valves would be multiport valves having a plurality of positions while being selectively adjustable to effect the connections referred to above and which connections would correspond to the connections obtained by the valves 50, 58, and 60 in FIGURES 3 and 5.

It will be understood that this invention is susceptible to modification in order to adapt it to different usages and conditions; and, accordingly, it is desired to comprehend such modifications within this invention as may fall within the scope of the appended claims.

We claim:

1. In an air conditioning system having improved dehumidification and humidity control at part load performance, a heat exchange unit having means for passing air to be cooled and dehumidified through said unit, comprising a plurality of individual coils disposed in parallel across the airflow passage, means for passing air to be cooled in parallel streams over said individual coils, means for supplying a chilled liquid heat transfer medium to each of the individual coils in parallel, means for thermally isolating one coil from another, valve means for modulating the supply of chilled liquid to each of said coils sequentially, each of said coils having the liquid thereto modulated from full-on to full-off before modulation of the liquid to another coil commences, and means responsive to the temperature of the cooled space controlling said valve means.

2. The invention as defined in claim 1, wherein the said valve means for modulating the supply of chilled liquid to each of the said coils is rotary.

References Cited in the file of this patent

UNITED STATES PATENTS

| 1,830,719 | Rollins | Nov. 3, 1931 |
| 2,105,882 | Fleisher | Jan. 18, 1938 |
| 2,238,688 | Guler | Apr. 15, 1941 |
| 2,283,386 | Newton | May 19, 1942 |
| 2,332,981 | Anderson | Oct. 26, 1943 |
| 2,637,985 | Ray | May 12, 1953 |
| 2,963,277 | Heller et al. | Dec. 6, 1960 |
| 3,047,274 | Wilson | July 31, 1962 |

CHARLES SUKALO, *Primary Examiner.*

HERBERT L. MARTIN, PERCY L. PATRICK,
*Examiners.*